Nov. 24, 1970 H. FRIGGER 3,543,285

HYDRAULICALLY AND MECHANICALLY ACTUATED DISK BRAKES

Original Filed June 1, 1967 4 Sheets-Sheet 1

Heinz Frigger
INVENTOR.

BY

Karl F. Ross
Attorney

HYDRAULICALLY AND MECHANICALLY ACTUATED DISK BRAKES

INVENTOR:
HEINZ FRIGGER
BY
Karl F. Ross
ATTORNEY

HYDRAULICALLY AND MECHANICALLY ACTUATED DISK BRAKES

Original Filed June 1, 1967

INVENTOR:
HEINZ FRIGGER
BY
Karl F. Ross
ATTORNEY

HYDRAULICALLY AND MECHANICALLY ACTUATED DISK BRAKES

Original Filed June 1, 1967 4 Sheets-Sheet 4

INVENTOR:
HEINZ FRIGGER
BY
Karl F. Ross
ATTORNEY

United States Patent Office 3,543,285
Patented Nov. 24, 1970

3,543,285
HYDRAULICALLY AND MECHANICALLY ACTUATED DISK BRAKES

Heinz Frigger, Langen-Oberlinden, Germany, assignor to Alfred Teves Maschinen- und Armaturenfabrik KG., Frankfurt am Main, Germany, a corporation of Germany Original application June 1, 1967, Ser. No. 642,915, now Patent No. 3,425,519. Divided and this application Oct. 10, 1968, Ser. No. 766,568
Claims priority, application Germany, June 11, 1966, T 31,333; June 24, 1966, T 31,443, T 31,444, T 31,445; June 25, 1966, T 31,457
The portion of the term of the patent subsequent to Feb. 4, 1986, has been disclaimed
Int. Cl. F16d *65/14*
U.S. Cl. 188—106 16 Claims

ABSTRACT OF THE DISCLOSURE

A disk brake having a brake disk, a brake support yoke disposed along the periphery of the disk, a pair of brakeshoes flanking braking faces of the disk and an actuating piston on the support yoke for shifting the brakeshoes into engagement with said disk to brake the latter. A circular wedge member having at least one wedging surface converging at an acute angle toward a braking face of the disk is displaceable in the direction of convergence of the wedging surface while being interposed between the support and piston or between piston and brakeshoe. A Bowden cable, spindle, eccentric, cam or other means applies a force to said wedge member in this direction.

This application is a division of application Ser. No. 642,915, filed June 1, 1967, now U.S. Pat. No. 3,425,519.

My present invention relates to a disk-brake system in which a pair of brakeshoes flank a brake disk whose braking faces extend transversely to the axis of rotation of the disk, which may be coupled to the wheel of a motor vehicle, while a brake yoke or support, affixed generally to the axle housing or chassis, lies along the periphery of the disk and is provided with one or more hydraulic cylinders for urging the brakeshoes thereagainst; more particularly, the present invention relates to auxiliary actuating means for shifting the brakeshoes, e.g. for use as parking, locking or emergency brake or for the automatic, self-adjustment of a pair of brakeshoes with respect to the disk.

It is common practice to provide, in a disk-brake system having a pair of brakeshoes flanking the disk and one or more hydraulic or other fluid-responsive cylinders for actuating these brakeshoes, self-adjusting means for compensating wear of the brake linings and/or mechanically operable brakeshoes for locking the disk relatively to the brake housing and serving as a parking emergency locking brake. In some cases, it has been proposed to employ a lever or the like to advance a hydraulic cylinder upon the tensioning of a flexible cable, thereby producing a clamping action independent of the hydraulic system for locking of the brake or for emergency operation thereof upon failure of a component of the hydraulic system.

Alternatively, a pair of separate brakeshoes are provided for actuation via a toggle arrangement or lever linkage to perform a similar function. Most self-adjusting mechanisms for hydraulically operable disk brakes provide friction means or pawl-and-ratchet systems for stepping the brakeshoe relative to the hydraulic piston upon wear of the brake linings, thereby maintaining the stroke of the brakeshoe required for actuation within relatively narrow limits. All of the prior-art mechanisms for these purposes have, in general, been unsatisfactory for various reasons. Thus, on the one hand, the lever linkages are relatively complex, expensive, and prone to failure while friction arrangements interposed between the hydraulic cylinders and a brakeshoe are sensitive to contamination by the hydraulic fluid or wear of the frictional surface. On the other hand, devices providing mechanical means operable through the hydraulic cylinder for urging the brakeshoes in the direction of the disk, involve complicated sealing arrangements, pawl-and-ratchet assemblies and the like.

It is, therefore, the principal object of the present invention to provide an improved auxiliary-brake-actuating mechanism, especially suitable for use in disk brakes having hydraulic actuating cylinders on one or both sides of the disk, which obviates the aforementioned disadvantages and permits operation of the brake for emergency, parking or locking action in a relatively simple and economical manner.

Yet another object of my invention is to provide an auxiliary brake-locking or braking mechanism in the disk-brake system of the character described which is actuatable from the operator's position of the vehicle and can be employed to apply the brake to an emergency-braking, brake-locking or parking brake system.

I have discovered that the foregoing objects can be attained in a relatively simple system applicable both to self-adjusting arrangements and to auxiliary brake mechanisms when the disk-brake system, having a disk whose braking faces are transverse to the axis of rotation of the disk and a yoke or brake support lying along the periphery of the disk, is provided with a member preferably forming a wedge and having at least one effective surface inclined at an acute angle toward one of the braking faces and interposed between a brakeshoe member and a support member (e.g. the piston or housing) while being shiftable in the direction of convergence of the brake face and the inclined surface of this member. The member, hereinafter referred to frequently as a shiftable or displaceable wedge, can be displaced by flexible cables, spindles, eccentric or cam arrangements or the like when it is to be used as the auxiliary braking mechanism of the disk-brake system. The brakeshoe which is displaced by the actuating body, may be an auxiliary brakeshoe flanking the disk independently of the hydraulically actuatable brakeshoes or may be the latter.

According to a specific feature of this invention, a locking, emergency or parking brake is provided with operating means at the driver's position of the vehicle coupled to the wedgelike member via force-transmission means (e.g. a Bowden line or cable) the operating means being constituted as a manually shiftable lever, foot-operated pedal or the like. It should be noted that a locking-brake shoe can be disposed on one side of the disk or a pair of such shoes may be provided on either side thereof. In the latter case, an auxiliary brake yoke may be provided to transmit the necessary force to a brakeshoe remote from the brakeshoe against which the wedge member is applied. This principle holds true when the locking-brake shoe is also a main-brake shoe and the wedge members are disposed between the hydraulic or pneumatic actuating means and the brakeshoe. Furthermore, when a pair of brakeshoes is to be operated concurrently by the wedge member, it has been found advantageous to privide a pair of wedge bodies, each disposed between a respective support and the brakeshoe on either side of the disk and to provide separate actuating linkages for each of these bodies.

The wedge body in accordance with the present invention can be of generally prismatic configuration with generally planar wedge surfaces convering toward one another in the direction of advance of the body and of generally flat configuration. One of these surfaces may be parallel to the braking face of the disk and engageable with a confronting surface of the support member or hydraulic piston (actuating member) or with the backing plate of the brakeshoe member. The other surface may be inclined to the plane of the braking face and disposed at an acute angle to the axis of the cylinder while engaging a complementarily inclined surface of the piston or the backing plate of the brakeshoe. In other variations along these lines, the present invention provides a plurality of wedgelike members convergent in opposite directions while the actuating means bears simultaneously upon at least two of these wedge members for shifting them relatively in the direction of the respective convergencies. In the preferred case, the movement of the wedge member or members is parallel to the disk and produces an axial displacement of the respective brakeshoe or brakeshoes.

It has been found to be especially convenient to run the Bowden line at least partly in a direction parallel to a secant of the disk brake is partly or wholly mounted in the wheel disk of the vehicle since the rim and the dished portions of the wheel disk define the outer boundaries of the disk-brake assembly. The Bowden cable in this case preferably runs radially inwardly so as not to interfere with the dished disk. The actuating or transmission element can, moreover, run parallel or skew to the axis of the disk.

The above and other objects, features and advantages of the present invention will become more readily apparent from the following description, reference being made to the accompanying drawing in which.

Figure 1A:
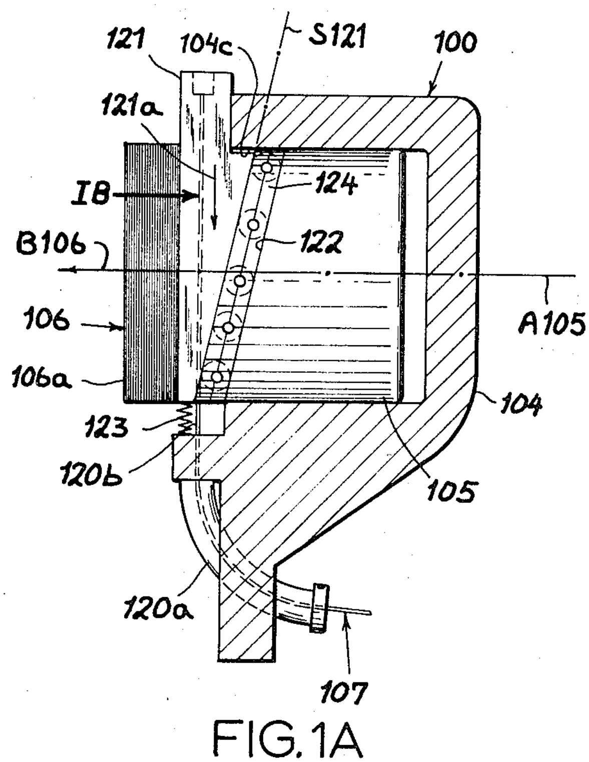
FIG. 1A is an axial cross-sectional view of an arrangement wherein the Bowden cable for shifting the movable wedge member runs radially inwardly, and friction-reducing means is provided between the co-operating surfaces.
Figure 1B:
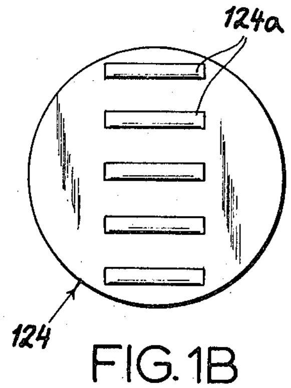
FIG. 1B is a view in the direction of arrow 1B of the antifriction means.

In FIGS. 1A and 1B, I have shown a system in which frictional interengagement between the wedge surfaces can be reduced below that of the system claimed in my above identified copending application. In this embodiment, the brake housing 100 has its cylinder 104 provided with a truncated piston 105 whose surface 122 is inclined to the axis $A_{105}$ of the piston and forms one of the co-operating wedge faces. Here, the other wedge member 121, to which the core wire **120*b* of the Bowden line 107 is anchored, is shiftable in the direction of arrow 121*a* and forms the backing plate for the brake line 106*a* of the brakeshoe 106. Between the surface 122 of the piston 105 and the surface $S_{121}$, I provide an antifriction disk 124 provided with bearings (FIG. 1B). Preferably, the bearings are needle bearings 124*a* whose cage is formed by the disk 124 and whose axes of rotation are parallel to one another and to the surface $S_{121}$. A restoring spring 123 resists movement of the wedge member 121 in the direction of 121*a*. When hydraulic fluid is supplied to the cylinder 104, the piston 105 is shifted to the left (arrow $B_{106}$) to urge the brakeshoe 106 against the disk (not shown), the upper end of the wedge member 121 being seated against the abutment surface 104*c*. For emergency-brake purposes, the Bowden line 107 is tensioned to shift the wedge member 121 in the direction of arrow 121*a* with the reduced force afforded by the antifriction disk 124, thereby camming the brake lining 106*a* against the brakeshoe (arrow $B_{106}$). The antifriction disk 124 can, of course, also be provided with ball bearings or roller bearings. The sheath for the core wire 120*b* of the Bowden line 107 is here formed by a rigid guide tube 120*a* fixed in the housing 100. In another modification of this system, the piston 105 is constituted of prismatic or rectangular transverse cross-section to prevent canting within the cylinder 104, the bearing disk 124** having rectangular configuration in this arrangement.

Figure 2A:
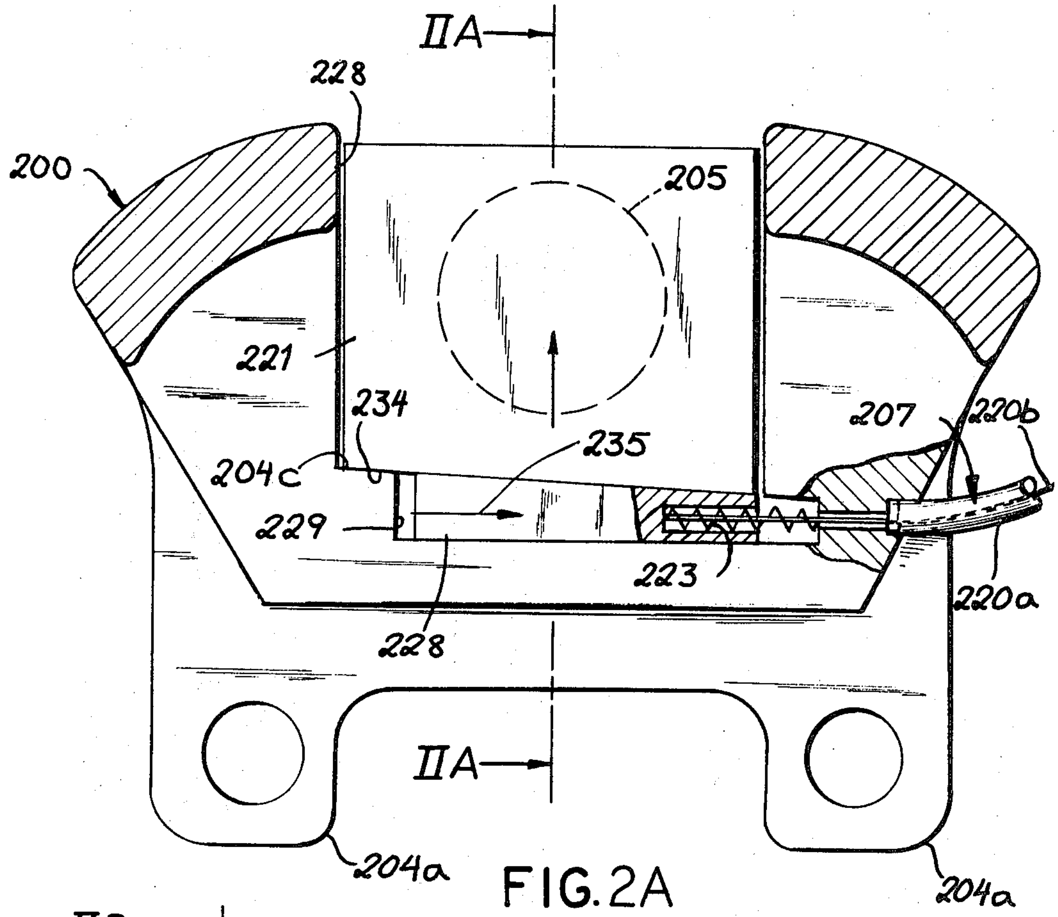
FIG. 2A is a partial cross-section along the line IIA—IIA of FIG. 2B and representing an end view of part of a brake yoke from the side of the disk in a disk brake provided with a wedging member in accordance with a modification of this invention.
Figure 2B:
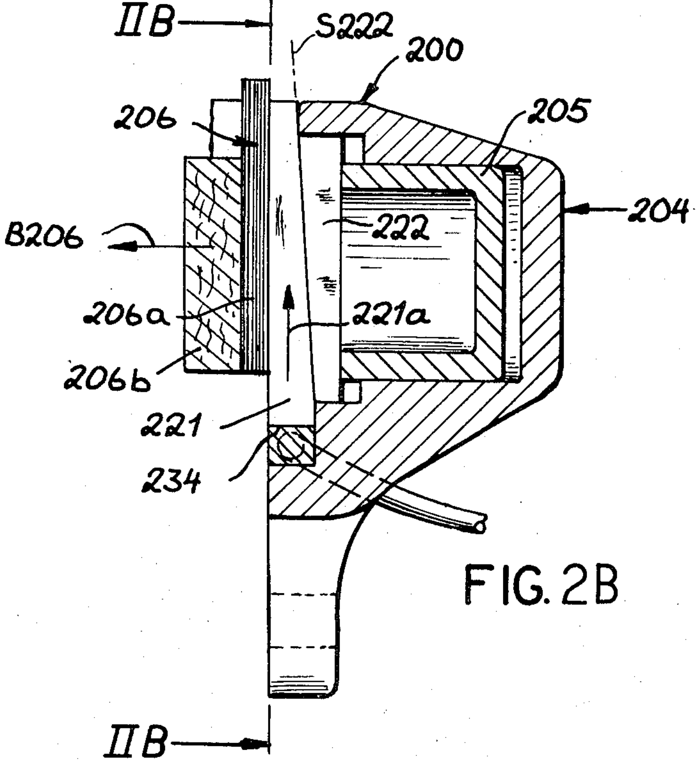
FIG. 2B is a cross-sectional view taken along the line IIB—IIB, of FIG. 2A.

FIGS. 2A and 2B represent another embodiment of this invention in which the brake housing is represented at 200 and can be mounted via lugs **204*a* on the axle housing of the vehicle wheel at the cylinder 204 of the device. The piston 205 of this arrangement is axially shiftable in its cylinder 204 and is provided at its left-hand end with a wedge body 222 integrally formed as part of the piston 205 or mounted thereon. The movable wedge member 221 here has an inclined-plane surface $S_{222}$ inclined upwardly toward the disk (not shown) and adapted to urge the brakeshoe 206 in the direction of arrow $B_{206}$ for application of the brake. The brakeshoe 206 has a friction lining 206*b* engageable with the disk and a backing plate 206*a* abutting against a face of wedge member 221. A further wedge arrangement is provided in the housing 200 to shift the auxiliary-brake wedge 221 in the direction of arrow 221*a***, this mechanism being best seen in FIG. 2A.

The actuating mechanism here includes a Bowden line 207 whose sheath **220*a* is anchored to the yoke 200 and whose core wire 220*b* engages an actuating wedge 228 to displace the latter against the force of a restoring spring 223 within a compartment 229 of the housing 200 beneath member 1421. The bottom surface 234 of the wedge member 221 slidably engages wedge 228 so that axial movement of the assembly 221, 222 and 206 (arrow $B_{206}$) by the piston 205 is not impeded. The surface 234 of the member 221 is inclined complementary to the configuration of the actuating wedge 228 so that, when the Bowden cable 207 is tensioned, the wedge 228 is displaced in the direction of arrow 235 (FIG. 2A) against the restoring force of spring 223, and the auxiliary-brake member 221 is consequently shifted in the direction of arrow 221*a*. This upward movement of member 221 urges the brakeshoe 206 into engagement with the brakeshoe. When the Bowden cable tension is released, the compression spring 223 shifts the actuating wedge 228 to the line (FIG. 2A) and permits member 221 to descend. An opening is provided at 225 to permit concurrent radial withdrawal of the brakeshoe 206 and the wedge member 221. Bowden line 207 may be, of course, actuated by any convenient mechanism at the driver's post of the vehicle. This device can be modified simply to render it suitable for use as a self-adjusting mechanism merely by omitting the Bowden cable 207 and using a tension spring at 223. In this case, the wedge 228 is advanced in the direction of arrow 235 when excessive play develops between the brakeshoe 206 and the piston 205, driver's movement of the actuating wedge 228 being received by the self-locking action of the ramp of this wedge. When the self-locking angle is selected and the Bowden line used in the assembly of FIG. 2A, the device acts simultaneously as a manually operable locking brake and a self-adjusting means. A seat is provided in the housing at 204***c* for the wedge member 221 to maintain the lever in position for actuation.

Figures 3, 4A, 4B, 5:
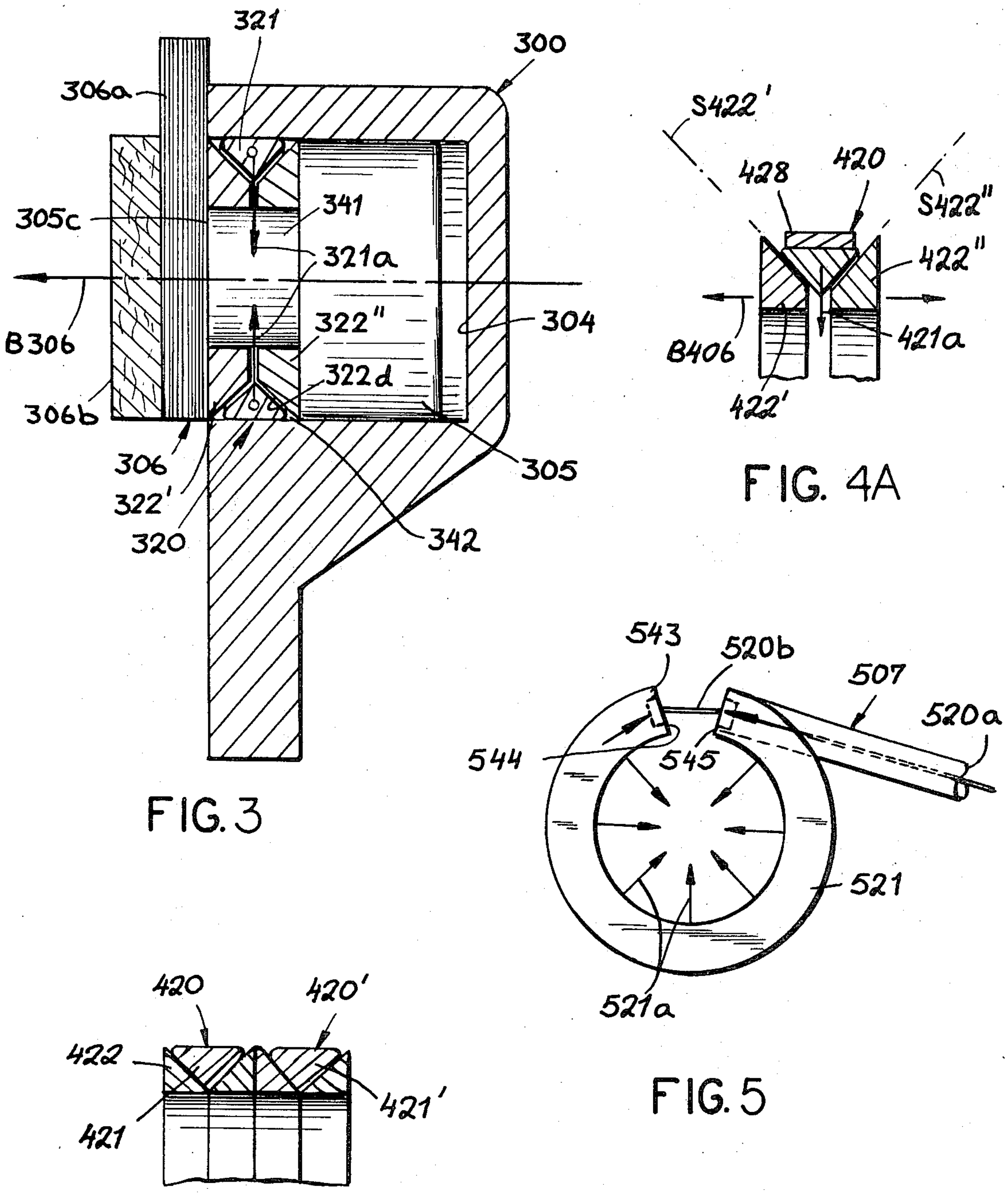
FIG. 3 is an axial cross-sectional view of a wedge arrangement in accordance with another aspect of my invention, the wedge member forming at least part of a ring.
FIG. 4A is an axial cross-sectional view of a wedging-ring arrangement in accordance with this aspect of the invention.
FIG. 4B is a view similar to FIG. 4A of a dual actuating arrangement.
FIG. 5 is a plan view of the actuating ring of FIG. 3 and its Bowden line, partly in diagrammatic form, illustrating the force components when the movement of the actuating member is radially inwardly.

In FIG. 3, I show the right-hand portion of a brake housing 300 whose cylinder 304 receives a piston 305 of round cross-section and bears via an axial abutment boss 341 with a surface 305*c* against the backing plate 306*a* of a brakeshoe 306 whose lining 306*b* is engageable with the disk. Thus, when hydraulic fluid is supplied to the cylinder 304, the piston 305 directly urges the brakeshoe 306 against the disk in the direction of arrow $B_{306}$. In the annular gap 342 within the cylinder 1504 surrounding the boss 341, I provide a self-adjusting or remotely controlled auxiliary brake arrangement having wedge members and indicated generally at 320. This mechanism comprises an elastically deformable wedging ring 321 of triangular cross-section whose vertex is received in a V-section peripheral gap 322*d* between a pair of frusto-conical rings 322′ and 322″ which are cammed axially outwardly when a radial inward compression is applied thereto in the direction of arrows 321*a*, as described in greater detail in connection with FIGS. 4A and 4B, FIG. 5, etc. Upon radial inward movement of the ring 321, the beveled ring 322″ is seated against the piston 305 while the other beveled ring 322′ is cammed axially outwardly (arrow $B_{306}$) to urge the brakeshoe 506 against the disk. As shown in FIG. 17, the ring 521 is split at 543 and has an end 544 to which the core wire 520*b* of a Bowden 507 is anchored. The sheath 520 of this cable is seated in the other extremity 545 of the split ring 521 which, upon tensioning of the Bowden line, has its ends drawn together to apply radially inward compressive forces (arrow 521*a*) to the beveled faces of the rings 522′ and 522″. The Bowden cable here runs generally tangentially to the ring 521.

In FIG. 4A, I show a modification of the assembly described in connection with FIGS. 3 and 5 wherein the rings 422′ and 422″ flanking the ring-shaped wedge member 421 is urged radially inwardly (arrow 421*a*) by a band 428 which may be tensioned by a Bowden line as shown at 507 in FIG. 5; the beveled ring 422″ is seated against the piston or the housing while ring 422′ is urged in the direction of arrow $B_{406}$ to shift the brakeshoe against the disk. When the device is used as a self-adjusting means, the engagement surfaces $S_{422'}$ and $S_{422''}$ are of self-locking frictional coefficient and the ring 428 is resilient to urge the wedge member 421 radially inwardly. The entire assembly 420 is displaced when the piston directly engages the brakeshoe or can be interposed between the piston and the brakeshoe.

In the system of FIG. 4B, a pair of wedge assemblies 420 and 420′ are axially stacked and have respective elastically deformable split-ring wedges 421 and 421′ which engage the beveled rings 422 as previously described. One of these wedges 421 or 421′ may be effective as a self-adjusting means in the manner previously described while the other is operated by a Bowden line 507 (see FIG. 5).

Figure 6A:
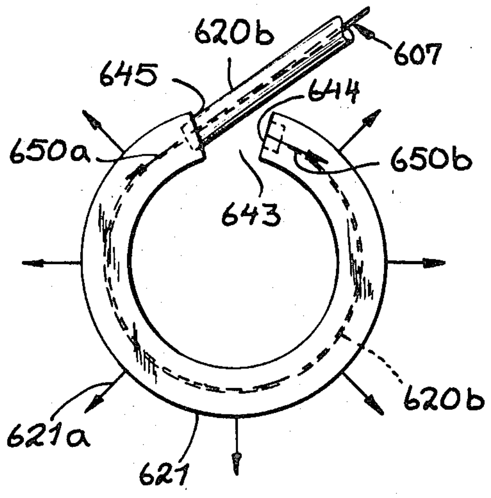
FIG. 6A is a view similar to FIG. 5 illustrating radial outward movement of the wedging member.
Figure 6B:
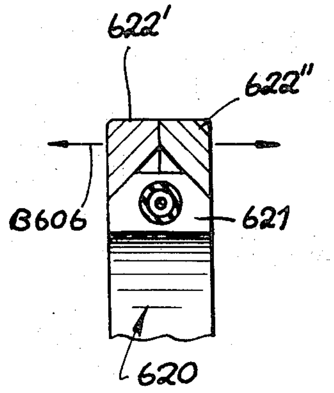
FIG. 6B is a cross-sectional view through the ring and wedge assembly of the device, using the actuating means of FIG. 6.

An alternative arrangement is represented in FIGS. 6A and 6B wherein the elastically deformable ring 621 has one end 644 of its split 643 anchored to the core element 620*b* of a Bowden cable 607 whose sheath 620*b* bears against the other end 645 of this ring. While the Bowden cable of the embodiment of FIG. 5 spanned the gap 543 between the ends 544 and 545 of the split ring, the core element of the embodiment of FIGS. 6A and 6B extends through the ring 621. Thus, when the Bowden line is tensioned, the ends 644 and 645 are spread apart at the gap 643 as represented by arrows 650*a* and 650*b* to apply radially outward force in the direction of arrow 621*a*. A pair of inwardly beveled rings 622′ and 622″ flank the outwardly converging wedge member 621 and are biased axially outwardly (arrow $B_{606}$) to urge the brakeshoe against the disk. The rings 621, 622′, 622″, etc., may form wedge assemblies 620 which can be stacked as illustrated in assemblies 420 and 420′ in FIG. 4B.

Figure 7:
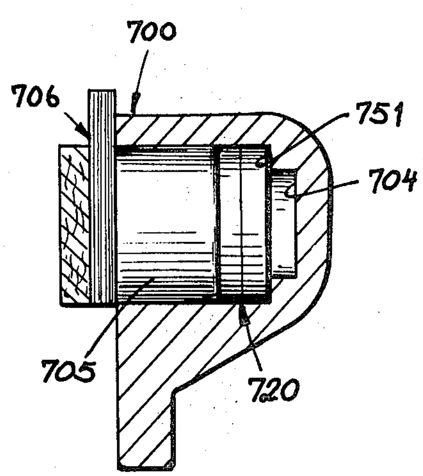
FIG. 7 is an axial cross-sectional view in which the wedging arrangement is shown to be positioned between the brake-support member and the piston member, by contrast with earlier described systems in which the wedging means is provided between the brakeshoe and the hydraulic piston.

Whereas the wedge assemblies 320, 420, 620 are provided between the piston and the brakeshoe, it will be understood that other arrangements of the piston brakeshoe and wedge assembly are also possible. Thus, in the system of FIG. 7, the brake housing 700 has a cylinder 704 whose piston 705 bears directly on the brakeshoe 706 while the annular self-adjusting or Bowden-actuated annular wedge assembly 720 is disposed between a seat 751 in the cylinders 704 and the rear end of the piston 705.

Figure 8:
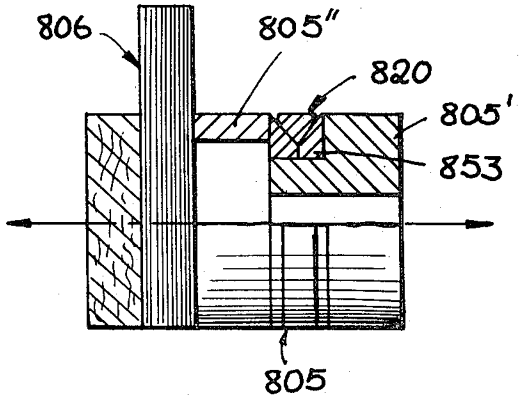
FIG. 8 is a fragmentary axial cross-sectional view of a system in which the wedging device is provided within the actuating means.

In the modification of FIG. 8, the piston 805, which is hydraulically shiftable in the cylinder in the usual manner, is subdivided axially into an annular right-hand portion 805′ and a left-hand portion 805″ which bears upon the brakeshoe 806. In an annular clearance 853 between the portions of the piston 805′ and 805″, I provide the self-adjusting or Bowden-operated wedge system 820 which, in this embodiment, can be identical to the assembly illustrated in FIG. 3 at 320. The assembly 720 can likewise be constituted either as the wedge assembly 320 or assemblies 420 or 620. When either arrangement is used in a self-adjusting system, the wedging faces of the rings are toothed or provided with layers of high frictional resistance. The Bowden lines of FIG. 5, 6A or the other annular wedge assemblies can, of course, be replaced by a threaded spindle adapted to draw the ends of the wedging ring together (FIG. 5) or spread them apart (FIG. 6A).

Figure 9:
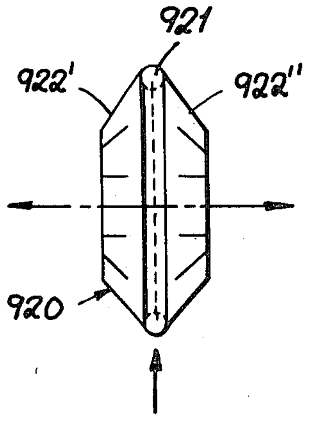
FIG. 9 is an elevational view of a system in which the stressing member of a locking brake in accordance with this invention is comprised of a pair of dished springs.

FIG. 9 shows a wedge assembly in which the rings 922′ and 922″ are spread axially by a compression ring 921 which may be drawn radially inwardly as illustrated and described in connection with FIG. 5. This assembly, too, is represented at 920 and may be disposed in any of the arrangements illustrated and described with respect to the assemblies 320, 420 and 620.

I claim:

1. An automotive-vehicle disk-brake system comprising:

a brake disk connected to a vehicle wheel;

a brake-support member disposed along the periphery of the disk;

a brakeshoe member flanking a braking face of said disk;

a hydraulic actuating member on said support member displaceable by brake-fluid pressure for shifting said brakeshoe member into engagement with said disk to brake relative rotation of said support member and said disk; and auxiliary means on said support member for shifting said brakeshoe member relatively to said disk, said auxiliary means including:

a wedge body axially aligned with said hydraulic actuating member and having at least one wedging surface converging at an acute angle toward said braking face of said disk and linearly displaceable in the direction of convergence of said wedging surface while being interposed between two of said members, a bearing disk received between said wedge body and at least one of said two members for accommodating linear displacement of said wedge body with limited frictional interference therewith, and means for applying a force to said wedge body in said direction.

2. The disk-brake system defined in claim 1 wherein said wedge body is constituted as part of a backing plate of said brakeshoe member.

3. The disk-brake system defined in claim 1 wherein said bearing disk is provided with a plurality of roller-bearing elements rollingly engaging said wedging surface of said body.

4. The disk-brake system defined in claim 1 wherein said one of said two members is said hydraulic actuating member and said actuating member is constituted as a fluid-responsive piston.

5. The disk-brake system defined in claim 4 wherein said means for applying said force to said wedge body is a Bowden cable anchored to said wedge body.

6. In a disk-brake system having a brake disk, a brake-support member disposed along the periphery of the disk, a brakeshoe member flanking a braking face of said disk, and an actuating member on said support member for shifting said brakeshoe member into engagement with said disk to brake relative rotation of said support member and said disk, the improvement which comprises auxiliary means on said support member for shifting said brakeshoe member relatively to said disk and including a wedge body having at least one wedging surface converging at an acute angle toward said braking face of said disk and displaceable in the direction of convergence of said wedging surface while being interposed between two of said members, a further wedge body displaceable in a direction perpendicular to the first-mentioned direction of the first-mentioned wedge body and interposed between said support member and said first wedge body for displacing the latter upon movement of said second wedge body, and means for applying a force to said second wedge body, thereby displacing said first wedge body.

7. The improvement defined in claim 6 wherein said wedge bodies are substantially coplanar and are formed with complementary slidably engaging surfaces, said means for applying said force to said second wedge body including a tension element anchored thereto.

8. The improvement defined in claim 7 wherein said tension element is a spring.

9. The improvement defined in claim 7 wherein said tension element is a Bowden cable, said system further comprising a spring bearing upon said second wedge body and biasing same against the tension of said Bowden cable.

10. An automotive-vehicle disk-brake system comprising:

a brake disk connected to a vehicle wheel;

a brake-support member flanking a braking face of said disk;

a hydraulic actuating member on said support member axially displaceable under brake-fluid pressure for shifting said brakeshoe member into engagement with said disk to brake relative rotation of said support member and said disk; and auxiliary means on said support member for shifting said brakeshoe member relatively to said disk independently of said actuating member and including, a wedge body having at least one wedging surface converging at an acute angle toward said braking face of said disk and displaceable in the direction of convergence of said wedging surface while being interposed between two of said members, said wedge body being formed as a ring coaxial with said actualing member and displaceable in a radial direction, at least one annular second wedge body complementarily engaging the first-mentioned wedge body and co-operating therewith for axial displacement of one of said wedge bodies in line with said actuating member upon radial displacement of said first wedge body, and means for applying a force to said first wedge body to displace same in said radial direction.

11. The disk-brake system defined in claim 10 wherein a pair of second wedge bodies are provided in the form of rings flanking the first wedge body, said first wedge body being formed with a pair of convergent flanks adapted to be radially driven between said rings upon radial displacement of said first wedge body.

12. The disk-brake system defined in claim 11 wherein said first wedge body has a pair of ends defining a gap between them, said means for applying force to said first wedge body including means for drawing said ends together.

13. The disk-brake system defined in claim 11 wherein said first wedge body has a pair of ends defining a gap between them, said means for applying force to said first wedge body including means for urging said ends apart.

14. The disk-brake system defined in claim 11 wherein said means for applying force to said first wedge body is a Bowden cable.

15. The disk-brake system defined in claim 14 wherein said rings and said first wedge body are interposed between said support member and said actuating member.

16. The disk-brake system defined in claim 14 wherein said rings and said first wedge body are interposed between said actuating member and said brakeshoe member.

References Cited

UNITED STATES PATENTS

| | | | |
|---|---|---|---|
| 837,732 | 12/1906 | Riley. | |
| 1,863,825 | 6/1932 | Blackmore. | |
| 2,055,258 | 9/1936 | McNeil | 74—110 |
| 2,850,119 | 9/1958 | Petersen | 188—73 |
| 2,897,935 | 8/1959 | Croft | 192—93 |
| 3,194,349 | 7/1965 | Kershner et al. | 188—72 X |
| 3,269,491 | 8/1966 | Belart et al. | 188—73 |
| 3,425,519 | 2/1969 | Frigger | 188—73 |

GEORGE A. HALVOSA, Primary Examiner

U.S. Cl. X.R.

74—110; 188—72; 192—93